(12) United States Patent
Courtney

(10) Patent No.: US 10,536,266 B2
(45) Date of Patent: Jan. 14, 2020

(54) CRYPTOGRAPHICALLY SECURING ENTROPY FOR LATER USE

(71) Applicant: Seagate Technology, LLC, Cupertino, CA (US)

(72) Inventor: Timothy J. Courtney, Longmont, CO (US)

(73) Assignee: Seagate Technology LLC, Cupertino, CA (US)

( * ) Notice: Subject to any disclaimer, the term of this patent is extended or adjusted under 35 U.S.C. 154(b) by 256 days.

(21) Appl. No.: 15/584,569

(22) Filed: May 2, 2017

(65) Prior Publication Data

US 2018/0323967 A1 Nov. 8, 2018

(51) Int. Cl.
| | | |
|---|---|---|
| G06F 21/00 | (2013.01) | |
| H04L 9/06 | (2006.01) | |
| H04L 9/08 | (2006.01) | |
| G06F 7/58 | (2006.01) | |

(52) U.S. Cl.
CPC .............. *H04L 9/0656* (2013.01); *G06F 7/58* (2013.01); *H04L 9/0643* (2013.01); *H04L 9/0869* (2013.01)

(58) Field of Classification Search
CPC ... H04L 9/0656; H04L 9/0643; H04L 9/0869; G06F 7/58
USPC .......................................................... 380/44
See application file for complete search history.

(56) References Cited

U.S. PATENT DOCUMENTS

| | | | |
|---|---|---|---|
| 4,291,386 A | 9/1981 | Bass | |
| 6,345,001 B1 | 2/2002 | Mokhlesi | |
| 6,408,317 B1 | 6/2002 | Djakovic | |
| 6,628,786 B1 | 9/2003 | Dole | |
| 6,714,955 B2 | 3/2004 | LaQuere | |
| 6,763,364 B1 | 7/2004 | Wilber | |
| 7,139,397 B2 | 11/2006 | Messina et al. | |
| 7,330,328 B2 | 2/2008 | Xie et al. | |
| 7,587,047 B2 | 9/2009 | Crandall et al. | |

(Continued)

OTHER PUBLICATIONS

The Keyed-Hash Message Authentication Code (HMAC), Jul. 2008, NIST/FIPS, FIPS PUB 198-1 (Year: 2008).*

(Continued)

*Primary Examiner* — Sarah Su

(74) *Attorney, Agent, or Firm* — Hall Estill Attorneys at Law

(57) ABSTRACT

Apparatus and method for managing entropy in a cryptographic processing system. In some embodiments, a first block of conditioned entropy is generated from at least one entropy source. The first block of conditioned entropy is subjected to a first cryptographic process to generate cryptographically secured entropy which is stored in a memory. The cryptographically secured entropy is subsequently retrieved from the memory and subjected to a second cryptographic process to generate a second block of conditioned entropy, which is thereafter used as an input in a third cryptographic process such as to encrypt or decrypt user data in a data storage device. The first cryptographic process may include an encryption algorithm to generate ciphertext and a hash function to generate a keyed digest value, such as an HMAC value, to detect tampering with the ciphertext by an attacker. The second cryptographic process may decrypt or further encrypt the ciphertext.

20 Claims, 4 Drawing Sheets

(56) References Cited

U.S. PATENT DOCUMENTS

| | | | |
|---|---|---|---|
| 8,019,802 B2* | 9/2011 | Rose | G06F 7/58 |
| | | | 708/254 |
| 8,144,872 B2 | 3/2012 | Hu et al. | |
| 8,209,540 B2 | 6/2012 | Brouwer et al. | |
| 8,312,071 B2 | 11/2012 | Kailas et al. | |
| 8,495,118 B2 | 7/2013 | Wang et al. | |
| 8,566,377 B2 | 10/2013 | Harris et al. | |
| 8,583,711 B2 | 11/2013 | Hars | |
| 9,357,002 B1* | 5/2016 | Roskind | H04L 67/104 |
| 9,794,059 B2* | 10/2017 | Nguyen | G08G 5/0013 |
| 2003/0065692 A1 | 4/2003 | Furukawa et al. | |
| 2003/0165242 A1* | 9/2003 | Walker | H04L 9/002 |
| | | | 380/277 |
| 2003/0194085 A1* | 10/2003 | Dillaway | G06F 21/6209 |
| | | | 380/29 |
| 2005/0033705 A1 | 2/2005 | Walmsley et al. | |
| 2005/0193045 A1 | 9/2005 | Yamamoto et al. | |
| 2007/0150531 A1 | 6/2007 | Jeon | |
| 2007/0271320 A1 | 11/2007 | Tsuyuzaki | |
| 2008/0010331 A1 | 1/2008 | Janke et al. | |
| 2012/0026784 A1 | 2/2012 | Kanai et al. | |
| 2013/0073598 A1 | 3/2013 | Jacobson et al. | |
| 2013/0136255 A1 | 5/2013 | Brown | |
| 2014/0037086 A1 | 2/2014 | Seol et al. | |
| 2014/0059555 A1 | 2/2014 | Bacher et al. | |
| 2014/0189792 A1* | 7/2014 | Lesavich | H04L 63/10 |
| | | | 726/3 |
| 2014/0372767 A1* | 12/2014 | Green | G06F 21/72 |
| | | | 713/189 |
| 2015/0055778 A1* | 2/2015 | Cox | H04L 9/0662 |
| | | | 380/46 |
| 2015/0117646 A1* | 4/2015 | Best | H04W 12/08 |
| | | | 380/270 |
| 2015/0199178 A1 | 7/2015 | Shi et al. | |
| 2015/0379301 A1* | 12/2015 | Lesavich | G06F 16/182 |
| | | | 726/28 |
| 2016/0124716 A1 | 5/2016 | Venkata et al. | |
| 2016/0154963 A1* | 6/2016 | Kumar | H04L 9/0825 |
| | | | 713/189 |
| 2016/0306750 A1* | 10/2016 | Tucker | G06F 12/1408 |
| 2016/0337346 A1* | 11/2016 | Momchilov | G06F 21/34 |
| 2016/0378972 A1* | 12/2016 | Ureche | G06F 21/31 |
| | | | 726/6 |
| 2017/0085654 A1* | 3/2017 | Mikhailov | G06F 7/76 |
| 2017/0155628 A1* | 6/2017 | Rohloff | H04L 9/30 |
| 2017/0244687 A1* | 8/2017 | Moulds | H04L 63/061 |
| 2018/0091298 A1* | 3/2018 | Saurav | H04L 9/0861 |
| 2018/0109508 A1* | 4/2018 | Wall | G06F 21/602 |
| 2018/0323967 A1* | 11/2018 | Courtney | H04L 63/061 |

OTHER PUBLICATIONS

Andrew Rukhin et al., A Statistical Test Suite for Random and Pseudorandom Number Generators for Cryptographic Applications, Apr. 2010, NIST, NIST Special Publication 800-22 (Year: 2010).*

"Secure Hash Standard (SHS)," Federal Information Processing Standards Publication, Mar. 2012, pp. 1-37, FIPS PUB 180-4, U.S. Department of Commerce: National Institute of Standards and Technology, US.

"Digital Signature Standard (DSS)," Federal Information Processing Standards Publication, Jul. 2013, pp. 1-130, FIPS PUB 186-4, U.S. Department of Commerce: National Institute of Standards and Technology, US.

Barker and Kelsey, "Recommendation for Random Number Generation Using Deterministic Random Bit Generators," NIST Special Publication 800-90A, Jan. 2012, pp. 1-136, U.S. Department of Commerce: National Institute of Standards and Technology, US.

Barker and Kelsey, "Recommendation for the Entropy Sources Used for Random Bit Generation," NIST Draft Special Publication 800-90B, Aug. 2012, pp. 1-78, U.S. Department of Commerce: National Institute of Standards and Technology, US.

Morris Dworkin, "Recommendation for Block Cipher Modes of Operation: The CMAC Mode for Authentication," NIST Special Publication 800-38B, May 2005, 25 pps, Computer Security Division, U.S. Department of Commerce, National Institute of standards and Technology, US.

Elaine Barker & John Kelsey, "Recommendation for the Entropy Sources Used for Random Bit Generation," NIST Draft Special Publication 800-90B, Aug. 2012, 78 pps, Computer Security Division, U.S. Department of Commerce, National Institute of Standards and Technology, US.

* cited by examiner

CRYPTOGRAPHICALLY SECURING ENTROPY FOR LATER USE

SUMMARY

Various embodiments of the present disclosure are generally directed to cryptographic processing systems, such as but not limited to a data storage environment.

In some embodiments, a first block of conditioned entropy is generated from at least one entropy source. The first block of conditioned entropy is subjected to a first cryptographic process to generate cryptographically secured entropy which is stored in a memory. The cryptographically secured entropy is subsequently retrieved from the memory and subjected to a second cryptographic process to generate a second block of conditioned entropy, which is thereafter used as an input in a third cryptographic process such as to encrypt or decrypt user data in a data storage device. The first cryptographic process may include an encryption algorithm to generate ciphertext and a hash function to generate a keyed digest value, such as an HMAC value, to detect tampering with the ciphertext by an attacker. The second cryptographic process may decrypt or further encrypt the ciphertext.

These and other features which characterize various embodiments of the present disclosure can be understood in view of the following detailed discussion and the accompanying drawings.

DETAILED DESCRIPTION

Figure 1:
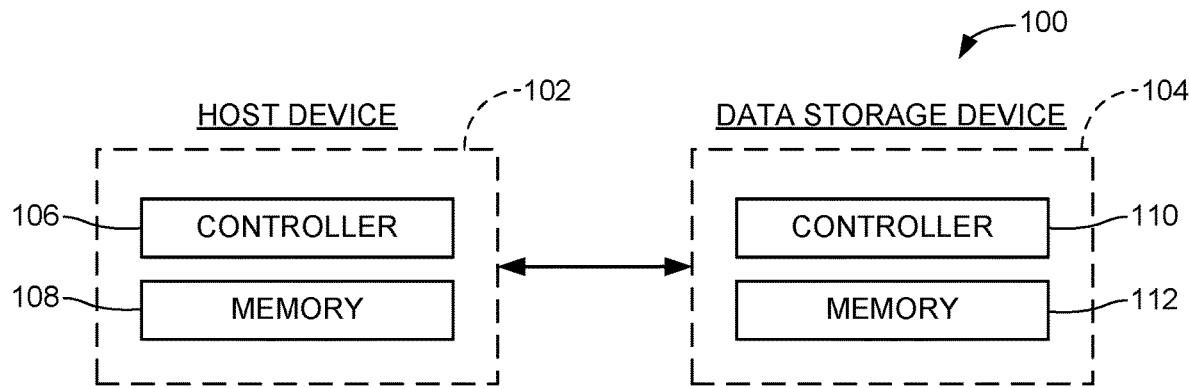
FIG. 1 is a functional block representation of a data processing system which operates in accordance with various embodiments of the present disclosure.

Data security schemes are used to reduce or eliminate access to data by unauthorized users of digital data processing systems. Data security schemes can employ a variety of cryptographic security techniques, such as data encryption and data security protocols.

Data encryption generally involves the transformation of an input data sequence plaintext) to an encrypted output data sequence (e.g., ciphertext) using a selected encryption algorithm (cipher). The cipher may utilize one or more pieces of auxiliary data (e.g., keys, counter values, nonce values, etc.) to effect the transformation. In this context, plaintext can include data that have been previously encrypted by an upstream encryption process. The algorithm may be symmetric or asymmetric. A symmetric algorithm operates to return (decrypt) the originally input plaintext by applying the same algorithm and auxiliary data to the previously generated ciphertext.

Data security protocols deal with maintaining the security of data within a system, such as by establishing symmetric keys, carrying out secret sharing transactions, establishing and verifying connections, authenticating data, generating digital signatures and keyed message digest values, etc. Of particular interest are keyed message digest values, which can be used to ensure that a given set of data has not been altered by an attacker or process. Keyed message digest values can take a variety of forms such as but not limited to message authentication codes (MACS), keyed-hash message authentication codes (HMACs), etc.

A keyed message digest value is a code word that provides indications of tampering with (e.g., changes to) an associated data set. In some cases, a hash function can be applied to a set of data to generate a digest value (e.g., an HMAC, etc.), and both the data and the digest value can be stored to a memory. During an authentication operation, the data can be retrieved and used to generate a new digest value that is compared to the original digest value. If the two digest values match, it can be determined that no changes to the data have been made and the data can be safely used. Keyed message digest values can be applied to both ciphertext (e.g., encrypted data) and plaintext (e.g., non-encrypted data).

Cryptographic operations often use entropy as part of the cryptographic processing. Generally, the term "entropy" relates to the amount of information that is present in a set of data. In one formulation, entropy can be thought of as the minimum number of bits required to represent the informational content of a set of data of interest.

A low entropy value has an informational content that can be described using a single bit or just a few bits. For example, an n-bit sequence of all logical is would generally have very low entropy, since all of the values of the sequence could be described by a single bit (e.g., a logical 1).

A high entropy value requires many bits to describe the informational content of the value. For example, a true random number string would have entropy corresponding to the number of bits in the string, so an n-bit random string would generally have n bits of entropy. This is because every bit in the sequence would be completely random and independent of every other bit in the sequence. Few if any repeating patterns would appear in the sequence, so another way of defining a high entropy value is a value that is susceptible to little or no lossless data compression.

Increasing the amount of entropy in values used in a cryptographic function tends to increase the security of the function against attack. Using an encryption key with high entropy makes it more difficult to guess the key or determine the key using brute force methods; adding a random string as an input to a hash function makes it that much more difficult to replicate or discover the inputs, and so on.

It is common to utilize various mechanisms to generate entropy in a device for use by cryptographic functions of the device. Random number generators in the form of ring oscillators, timing circuits, etc. can be used to generate values of high entropy. Other circuits and devices can be provided to generate low entropy values, such as the total number of pulses required to program semiconductor memory cells to certain values, etc. Low entropy values can be converted to high entropy values using well known extraction and certification techniques.

A problem arises when an entropy generation process requires some amount of elapsed time in order to extract and qualify the entropy. For example, should a processing device undergo a power cycling operation, where the device (and the entropy generation process) is powered down, there may be a significant delay before the device can acquire new entropy sufficient to enable certain cryptographic functions once the device has been reinitialized.

Various embodiments of the present disclosure are accordingly directed to an apparatus and method for enacting a cryptographic processing system in a processing device, such as but not limited to a data storage device. As explained below, some embodiments provide the processing device with an entropy manager circuit that extracts and qualifies entropy values from one or more entropy sources during operation of the processing device. The source(s) may provide high entropy and/or low entropy. The conditioned entropy values are used as an input to a cryptographic function carried out by or in conjunction with the device.

The entropy manager circuit is further configured to generate and store entropy for future use. To this end, at least some the entropy values qualified by the entropy manager circuit are cryptographically secured and stored in a suitable memory location. This allows previously qualified entropy to be made immediately available to the device, which can be helpful in situations where the entropy manager circuit is offline or otherwise not in a position to supply the entropy at that time.

The conditioned entropy satisfies certain entropy constraints, including having at least a minimum acceptable level of entropy. The conditioned entropy is cryptographically secured by applying one or more cryptographic functions. In some cases, the conditioned entropy is subjected to one or more encryption operations using at least one encryption key, to generate encrypted entropy. A keyed message digest value, such as but not limited to an HMAC value generated through the use of a hash function, is additionally applied to the conditioned entropy. Both the encrypted entropy and the keyed message digest value are stored in memory. The memory may or may not be accessible to an attacking party during analysis of the device.

When the conditioned entropy is required by the system, the keyed message digest value is recalculated and a comparison is carried out to determine whether any tampering has occurred with respect to the encrypted entropy. If not, the encrypted entropy is subjected to a second cryptographic function to provide conditioned entropy for use by the system. In some cases, the encrypted entropy is decrypted to return the originally presented conditioned entropy. In other cases, a different encryption function is applied to generate a new set of conditioned entropy that is different, but shares the same level of entropy, as the originally presented conditioned entropy.

In this way, pre-conditioned entropy can be generated in advance and safely stored in the system. Even if an attacking party is able to access the entropy in its stored condition, the entropy is stored in a cryptographically secured form so that the attacking party cannot determine, from an examination of the stored entropy, the actual input that is subsequently provided to the cryptographic function after decryption/further encryption. Similarly, efforts to tamper with the stored entropy by substituting a different sequence of known values can be easily detected via the keyed message digest value.

These and other features and advantages of various embodiments can be understood beginning with a review of FIG. 1 which shows a data processing device 100. The data processing system 100 includes a host device 102 operably coupled to a data storage device 104. This is merely illustrative as any number of different types of data processing environments can be used as desired, including environments that do not involve data storage systems.

The host device 102 and the data storage device 104 in FIG. 1 can each take a variety of forms. Without limitation, the host device 102 may take the form of a personal computer, workstation, server, laptop, portable handheld device, smart phone, tablet, gaming console, RAID controller, etc. The data storage device 104 may be a hard disc drive (HDD), solid-state drive (SSD), hybrid solid state drive (HSSD), thumb drive, optical drive, an integrated memory module, a multi-device storage enclosure, etc. The data storage device 104 may be incorporated into the host device as an internal component or may be an external component accessible via a communication pathway with the host device 102 including a cabling connection, a wireless connection, a network connection, etc.

For purposes of the present discussion, it will be contemplated that the host device 102 is a computer and the data storage device 104 provides a main memory store for user data generated by the host device. The host device 102 includes a host controller 106 and local host memory 108. In this example context, the host controller 106 is a programmable processor circuit that executes an operating system (OS) resident in the memory 108, as well as one or more applications accessed through a user interface (not separately shown).

The data storage device 104 includes a storage device controller 110 and storage memory 112. The storage device controller 110 is a control circuit that provides top level control of the storage device and operates to schedule and direct execution of data access commands from the host device 102 to transfer user data between the storage memory 112 and the local host memory 108.

The storage device controller 110 can be realized as a system on chip (SOC) integrated circuit device of the storage device 104. The controller may include one or more programmable processor circuits that execute firmware (FW) programming stored in the memory 112. Additionally or alternatively, the controller may include one or more non-programmable hardware circuits such as ASICs (application specific integrated circuits), FPGAs (field programmable gate arrays), gate logic, etc. arranged to carry out various functions.

It is contemplated that the data processing system 100 incorporates one or more data security schemes to protect the system from unwanted access by unauthorized third parties. The data security scheme(s) may take a variety of forms, including modules that control access to the host and to the storage device. A variety of cryptographic functions, such as but not limited to encryption systems and security protocols, may be used to protect user data stored in the data storage memory 112 as well as in other storage locations within the device 100.

Figure 2:
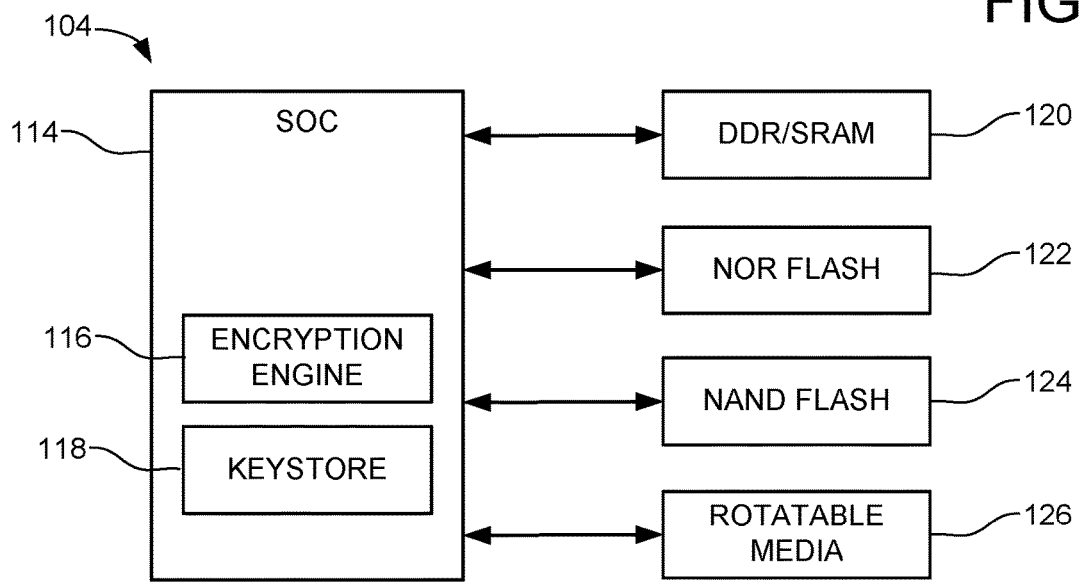
FIG. 2 shows a configuration of the data storage device of FIG. 1 in accordance with some embodiments.

FIG. 2 is a functional block diagram of relevant aspects of the data storage device 104 in accordance with some embodiments. The controller functionality is realized including through a system on chip (SOC) device 114 with various internal operational and storage capabilities including an encryption engine circuit 116 and a memory 118. The memory 118 stores a keystore as a data structure that houses various cryptographic function data values such as encryption keys, counter values, HMAC values, entropy values, etc. This arrangement is merely exemplary and is not limiting, as other arrangements can be used.

The SOC 114 interfaces with various memory devices and/or tiers within the storage device 104 including local volatile (e.g., DDR DRAM and/or SRAM) memory 120, NOR flash memory 122, NAND flash memory 124 and rotatable media (discs) 126. Not all of the memory elements shown in FIG. 2 are required; for example, the configuration shown is characterized as a hybrid storage device so that write data from the host device 102 may be stored in the NAND flash 124 prior to being archived to the rotatable media 126. However, the device can be alternatively configured as an SSD so that the NAND flash 124 provides the main store and the rotatable media 126 are omitted. Other arrangements can be used as well.

Generally, data such as user data, metadata, control data and other forms of data used in support of data transfer operations with the host device 102 will be stored at different times and in different ways to these and other forms of memory. At least some or all of these data sets may' be subjected to cryptographic processing by the SOC 114 as part of a cryptographic security scheme.

Figure 3:
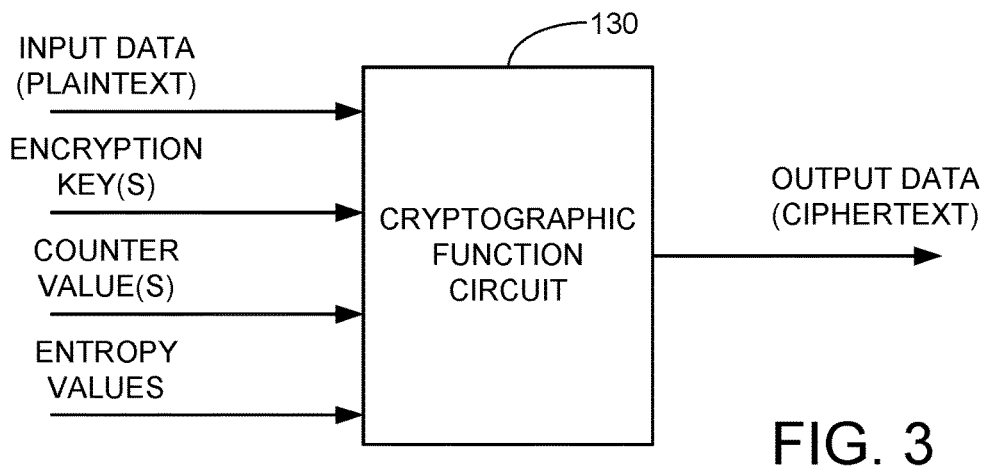
FIG. 3 is a cryptographic function circuit that may be used by the data storage device.

FIG. 3 shows a cryptographic function circuit 130 of the data storage device 104. The circuit 130 may be realized in hardware and/or firmware via a programmable processor. The circuit 130 may form a portion of the SOC 114 or may be a separate circuit under the control of the SOC.

Generally, the cryptographic function circuit 130 is arranged to perform one or more cryptographic functions upon various sets of input data (e.g., plaintext) to generate cryptographically processed output data (e.g., ciphertext). As noted above, the function can include an encryption algorithm, a decryption algorithm, a hash function, etc. Various inputs of auxiliary data may be supplied as part of the algorithm including encryption keys, counter values, and entropy values. Such values may be supplied from the keystore 118 (FIG. 2) or from other locations within the device 104. In some cases, the entropy values may be cryptographically secured entropy that is processed and stored in the various memory locations 120-126 in a manner described below.

Figure 4:
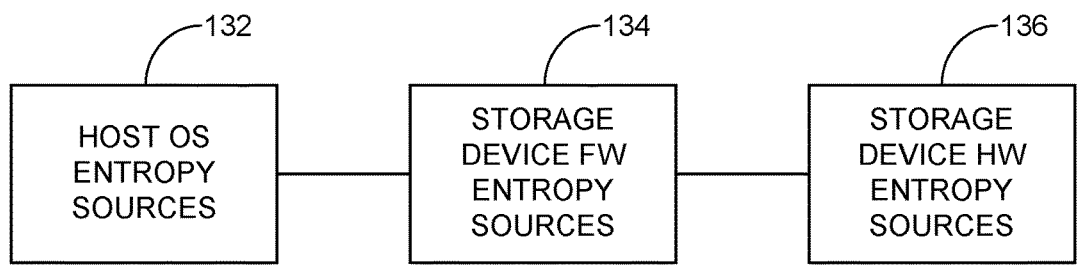
FIG. 4 illustrates different types of entropy sources that may exist in the host device and data storage device of FIG. 1.

FIG. 4 shows a number of different entropy sources that may be used to generate entropy for use by the system. These are merely illustrative of the types of sources that may be utilized and are neither limiting or required. The sources in FIG. 4 include host operating system (OS) level entropy sources 132, storage device firmware (FW) entropy sources 134, and storage device hardware (HW) entropy sources 136. Each of these can take a variety of forms depending on the requirements of a given application, and may tend to produce widely different levels of entropy in their respective outputs. Some of the sources can exhibit extremely low levels of entropy. Extraction techniques can be applied to extract random sequences with high levels of entropy from input values having relatively lower levels of entropy.

In some cases, various trust levels may be associated with different entropy sources. The term "trust level" relates to the extent to which entropy in the output from an entropy source can be trusted. Trust level is based on a variety of factors. A storage device might treat the entropy sources within its control as having a relatively high level of trust, since the entropy sources reside within the confines of its own system space (so called "cryptographic trust boundary" or just "boundary"). A source outside this boundary, such as a host operating system (OS) entropy source, might be treated as being less trustworthy. Additional cryptographic trust boundaries may be formed within the storage device. For example, the storage device may view internal hardware based sources as more trustworthy as internal firmware based sources.

It can be seen that entropy and trust levels are different, albeit related, concepts. A source that normally generates relatively high levels of entropy could be found to have a relatively low trust level, and a source that normally generates relatively low levels of entropy could be found to have a relatively high trust level. A number of statistical tests, certification protocols and hardening techniques are known in the art to evaluate both entropy and trust levels from a given source.

Referring again to FIG. 4, the host OS entropy sources 132 are located within the host device 102 and can include programs, applications, OS subroutines, etc. that generate entropy values. One well known host OS level entropy source is the /dev/random function call (file) available in many UNIX® based operating systems. Execution of this function call returns a string of random numbers based on an accumulated pool of entropy values.

Some host OS level entropy sources can have a hardware component, such as specially configured circuits that generate statistically random noise signals based on various effects such as thermal noise, the photoelectric effect or other quantum phenomena, timing of certain events, etc. For example, a counter and timing system can be used to aggregate entropy values based on system events (e.g., keystrokes, system calls, etc.).

The storage device FW level entropy sources 134 in FIG. 4 are located in the data storage device 104 and relate to entropy values generated by the storage device firmware. Examples include routines similar to the host OS level entropy sources such as timing circuits that aggregate entropy values based on system events, etc.

The storage device HW entropy sources 136 in FIG. 4 are also located in the data storage device and relate to entropy values obtained from the storage device hardware. Examples include ring oscillators and other specially configured random bit generator circuits designed to output entropy values. Based on the construction of the data storage device, accumulated parameters obtained during normal storage device operation can also be used to generate low entropy values. For example, back electromotive force (BEMF) measurements of a voice coil motor (VCM) or spindle motor associated with the rotatable media 126 (FIG. 2) can be used to generate entropy values. Entropy values can also be generated by accumulating the number of programming pulses required to program various solid-state memory cells in the NAND flash memory 124, etc. It will be appreciated that the foregoing examples of entropy sources are merely exemplary as any number of different types of entropy sources can be used in accordance with the present discussion.

The different entropy sources represented in FIG. 4 tend to have different trust levels. Generally, the host OS entropy sources 132 may be viewed as having the lowest trust levels, the storage device FW entropy sources 134 may have higher trust levels, and the storage device HW entropy sources 136 may have the highest trust levels. Other applications may exhibit different characteristics so the foregoing observations are merely for discussion purposes and are not limiting. The locations of cryptographic trust boundaries, the application of source certifications and/or hardening efforts, and the physical constructions of specific entropy sources can also affect the respective trust levels of the sources.

Figure 5:
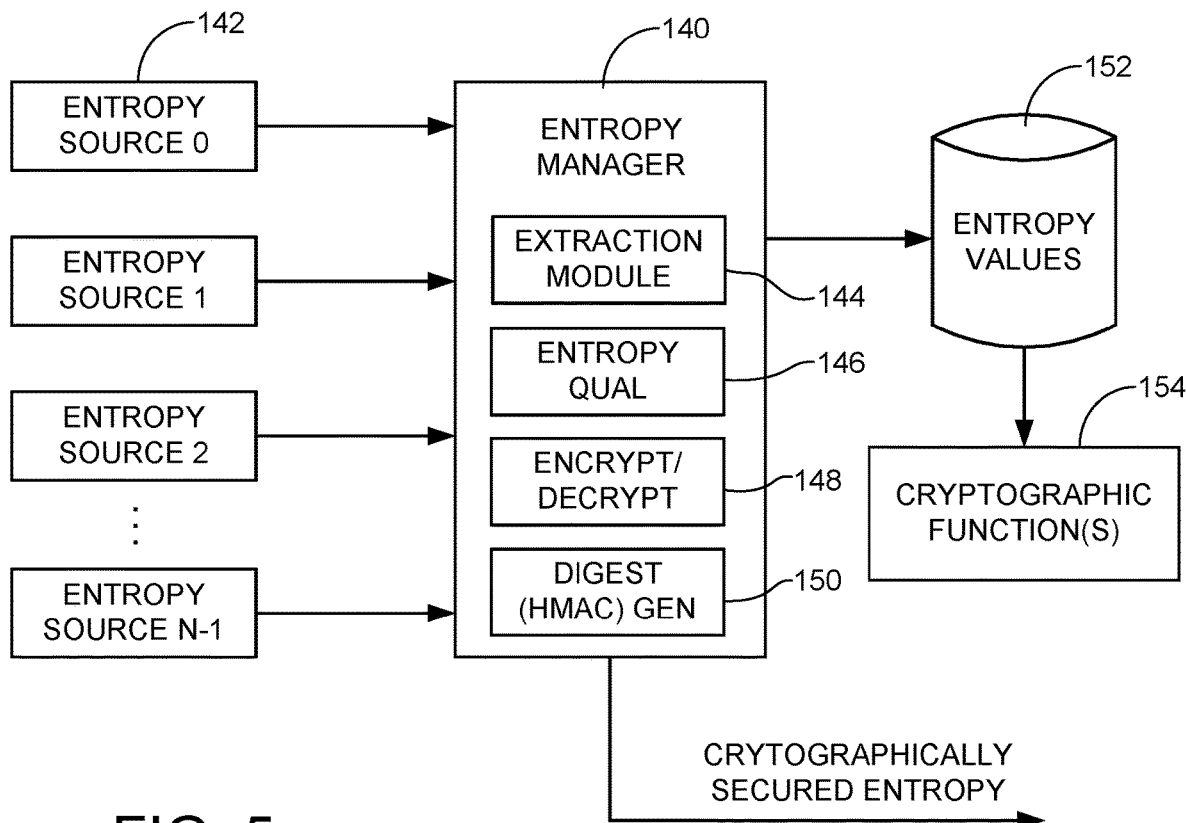
FIG. 5 is a functional block representation of an entropy manager circuit operable in accordance with various embodiments to generate and store conditioned entropy for use by the data processing system of FIG. 1.

FIG. 5 shows an entropy manager circuit 140 that uses entropy sources such as represented in FIG. 4 to generate conditioned entropy (e.g., random numbers having at least a minimum acceptable amount of entropy). The entropy manager 140 is disposed within the data processing system 100 (FIG. 1), and may be located in the host device 102 or the data storage device 104. In some embodiments, a separate entropy manager 140 is located within each of these devices 102, 104 to locally generate random numbers for use by that device. As before, the entropy manager circuit may be realized in hardware and/or firmware.

The entropy manager 140 receives entropy values from N entropy sources 142, identified as entropy sources 0 through N-1. The entropy sources 142 may be distributed among various operational devices such as represented in FIG. 4. If the entropy manager 140 is located within the data storage device 104, some or all of the entropy sources may also be located in the data storage device.

The entropy manager 140 includes a number of circuits (hardware or firmware based modules) including an extraction module 144, an entropy qualification module 146, an encryption/decryption module 148 and a digest (HMAC) generator module 150. Conditioned entropy generated by the circuit 140 may be temporarily stored in a memory 152 pending use by one or more cryptographic functions 154 (which in turn may correspond to function circuit 130 in FIG. 3). In some cases, the memory 152 may be volatile so that the entropy does not remain resident in the system upon a system shutdown or other reset event, but instead is more or less used on an on-demand basis. As will be appreciated, the present disclosure contemplates that it is generally inadvisable to maintain conditioned entropy in an easily accessible, unprotected form since an attacking party may use this as a vehicle to carry out side-channel attacks on the system.

The extraction module 144 includes an entropy extractor circuit adapted to extract entropy from one or more low entropy sources. The output bit sequences from the extractor are supplied as an input to the qualification module 146, which generates conditioned entropy therefrom. The module 146 can take any number of forms and can be designed to perform various statistical tests to generate the conditioned entropy with requisite levels of specified entropy and other factors.

The sources of the entropy (and the respective trust levels, as desired) can be taken into account by the qualification module 146. Implementations for the module 146 can include Galois/Counter Mode (CGM) processing, random number generation, application of universal or secure hash algorithm (SHA) hash functions, etc. In some cases, fixed sized blocks of conditioned entropy, such as 128 bit (32 byte) blocks, may be generated, and multiple blocks of such entropy will be successively passed to the memory 150.

It is contemplated albeit not necessarily required that the blocks of entropy will be generated at a regular rate, and it will take some finite amount of time to generate the entropy blocks. In some cases, the rate at which the blocks are generated can be adaptively adjusted based on need or other factors, such as every X minutes, etc.

Figure 6:
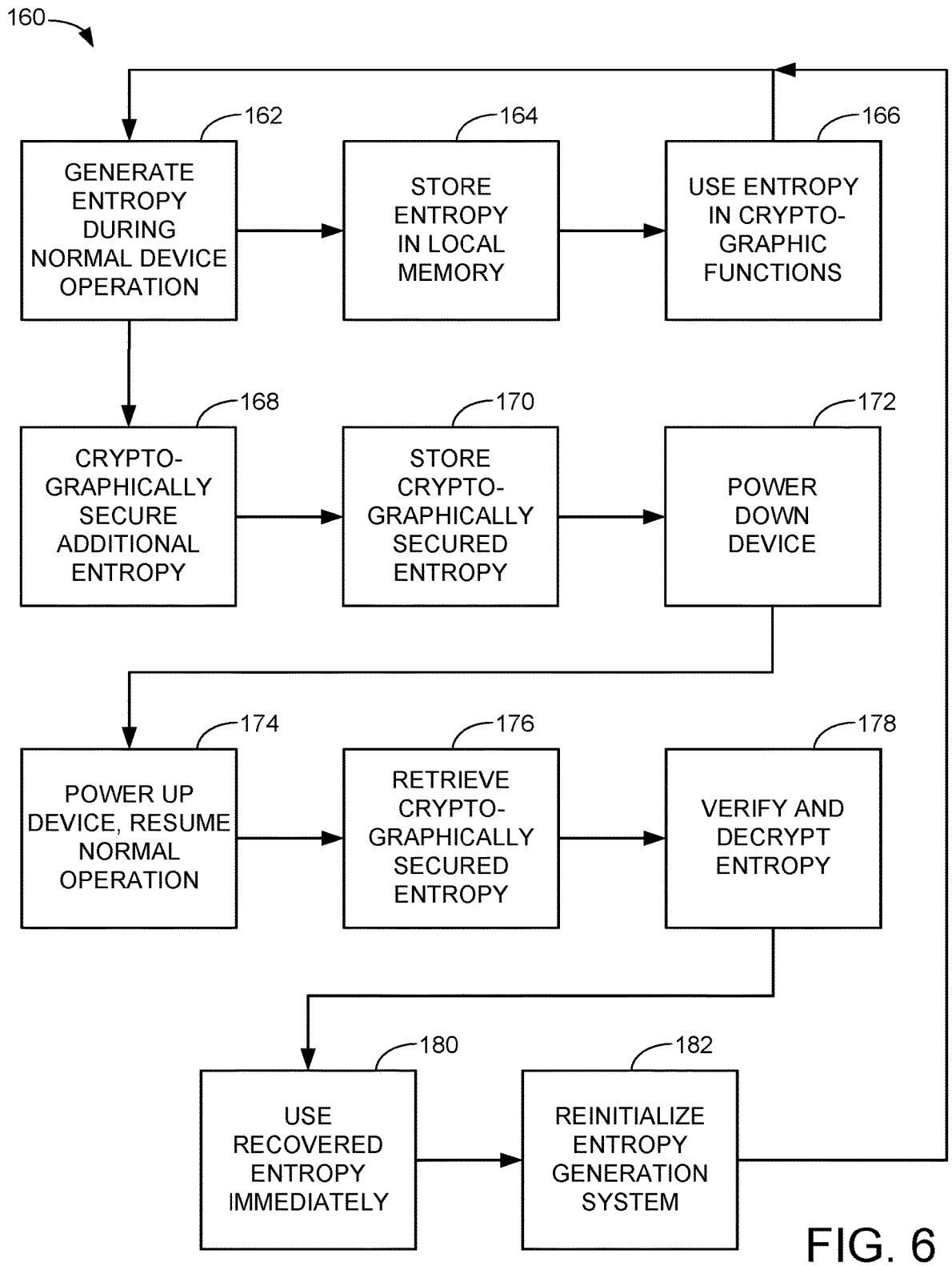
FIG. 6 is a process flow diagram representing operations that may be carried out by the entropy manager circuit in some embodiments.

FIG. 6 provides a sequence flow diagram 160 to illustrate various operations that are carried out by the entropy manager circuit 140 of FIG. 5 in accordance with some embodiments. Block 162 shows the operation of the entropy manager circuit 140 to generate blocks of conditioned entropy on an ongoing basis during device operation. The conditioned entropy is stored in a local memory at block 164, such as in the memory 152 of FIG. 4, followed by use of the conditioned entropy in various cryptographic functions at block 166. Blocks 162 through 166 thus represent normal operation of the manager circuit as described above.

FIG. 6 shows a second parallel path of processing from block 162 to block 168 to produce cryptographically secured entropy. FIG. 6 shows these as separate and parallel pathways to distinguish between entropy that is continuously generated and used as needed and entropy that is secured for future use. The skilled artisan will appreciate that such parallel processing as depicted by FIG. 6 is exemplary and not limiting; in other arrangements, all entropy used by the system can be cryptographically secured and then used as required. As noted above, one example where the entropy may be saved for future use would be during a subsequent operational session of the device, which is addressed in FIG. 6. Other sequences are contemplated, such as transferring the cryptographically secured entropy to another device, generating "extra" entropy in anticipation of an upcoming need, etc.

Block 168 operates to secure the conditioned entropy through the application of one or more additional cryptographic functions to the input conditioned entropy by the entropy, manager circuit 140. Once secured, the entropy manager circuit 140 directs the storage of the cryptographically processed entropy in a suitable memory location at block 170. This may include one or more of the various memory locations 120-126 of FIG. 2. It is contemplated that the stored entropy may be accessible to a motivated attacker, although such is not required.

Block 172 shows a power down event that is experienced by the storage device 104. This may be a scheduled shut down, a unplanned power outage event, etc. At this point the device 104 will undergo a transition from an activated (normal or powered up) state to a deactivated state. In some cases, standby power may be available to permit control circuitry of the device, such as the SOC 114, to perform certain housekeeping operations prior to a full loss of power. Certain data structures such as maps, user data, etc. may be migrated to non-volatile storage locations during this shut-down period as is known in the art. In some cases, the generation of cryptographically secured entropy may not normally occur during normal operation, but is initiated as a result of the detected power down event. The standby power required during this power down transition may be supplied by a local power source (e.g., battery, charged capacitor, BEMF from rotating discs, etc.).

The device 104 is subsequently powered up at block 174. A boot process may be employed to reinitialize the device and place the device in an operationally ready mode to resume normal operation. It is contemplated that either as part of the reinitialization process or as part of the resumption of normal mode, the device will require the use of conditioned entropy. Depending on the time constraints required to restart the operation of the entropy manager circuit, there may be some amount of delay before conditioned entropy is available via the normal mechanism (e.g., blocks 162, 164 and 166).

To meet this interim need, a control circuit operates such that the cryptographically, secured entropy is retrieved from memory at block 176, verified and decrypted at block 178, and used at block 180. The control circuit may be the SOC 114 or aspects of the entropy manager circuit 140, as desired. It will note that the entropy manager circuit 140 may be operable at power up, but the time associated with generating new blocks of entropy may be such that there is a delay before the first block during this new session can be conditioned and ready for use. Hence, block 182 shows initialization of the entropy generation operation of the entropy manager circuit so that the generation of new blocks of conditioned entropy can resume at block 162. The cryptographically secured entropy will continue to be retrieved, verified, decrypted and used until the new blocks of entropy can be generated (e.g., entropy generation is operational).

Figure 7:
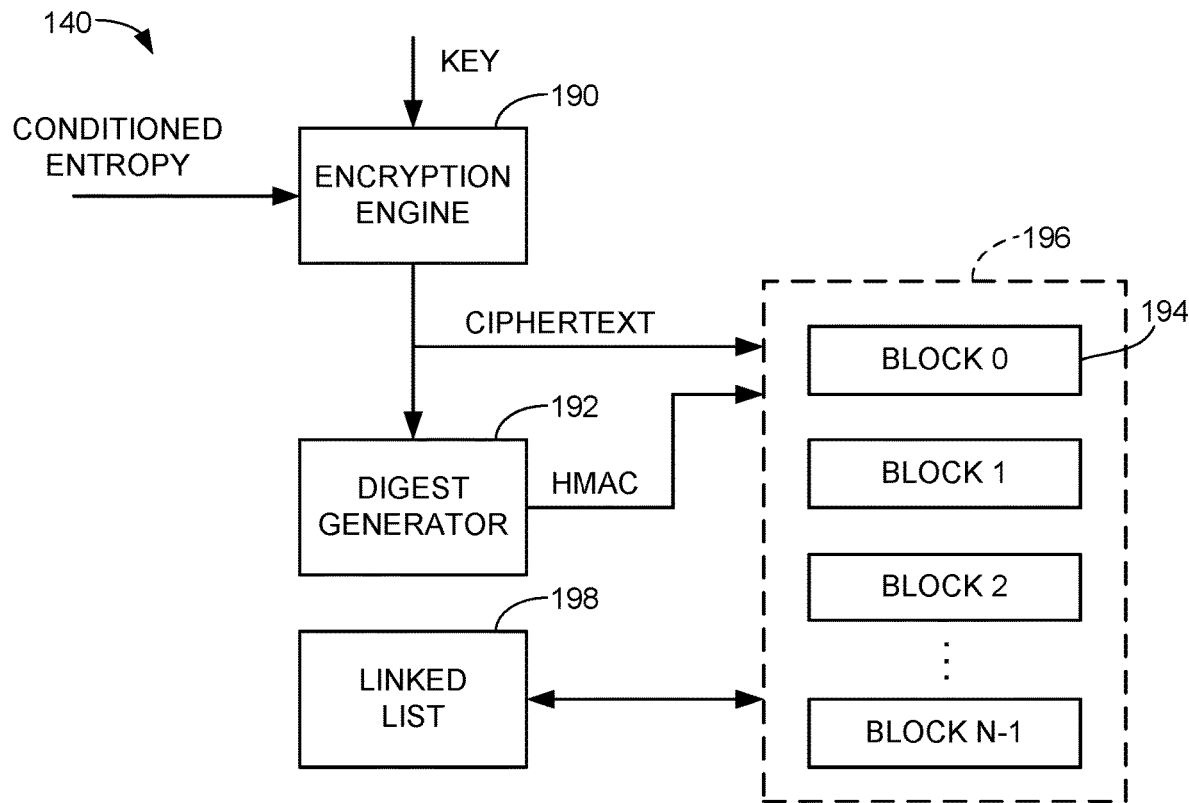
FIG. 7 shows a manner in which the entropy manager circuit cryptographically secures conditioned entropy in some embodiments.

FIG. 7 is a functional block diagram of aspects of the entropy manager circuit 140 in further embodiments. An encryption engine circuit 190 receives one or more blocks of conditioned entropy from the entropy qualification module 146 (FIG. 5). In some cases, the operation is carried out on eight (8) 128 bit blocks of conditioned entropy, or 1024 total bits (128 bytes) total. Other values can be used.

The encryption engine 190 encrypts the input conditioned entropy using a suitable encryption key to generate output ciphertext. Substantially any form of encryption can be used, and other input auxiliary data values can be used as well as part of the encryption process. These values may be maintained in the keystore within the SOC 114 (see FIG. 2), or elsewhere. The output ciphertext may have the same number of bits as the input conditioned entropy, or a different number of bits.

A digest generator 192 receives the ciphertext and generates a key digest value (in this case, an HMAC) of selected length. The length of the HMAC may be the same length as the ciphertext, or shorter or longer than the ciphertext as required. Both the generated ciphertext and the HMAC are thereafter stored as a block of cryptographically secured entropy, as indicated at 194 in a memory 196. In some embodiments, each block is 2048 bits (256 bytes) although other values can be used. The memory 196 can be any suitable memory, such as the NOR flash 122 or the NAND flash 124 in FIG. 2.

In some cases, a total N blocks 194 of the cryptographically secured entropy are maintained at various locations within the memory 196. A mapping data structure such as a linked list 198 is used to track the locations of the various blocks 194. In some cases, each block is immediately erased or otherwise overwritten with data once the cryptographically secured entropy has been retrieved and used to reduce persistence in the system. The system may operate to maintain some predetermined amount of secured entropy (e.g., N total blocks where N is some suitable number such as N=10, 32, etc.) at substantially all times.

Figure 8:
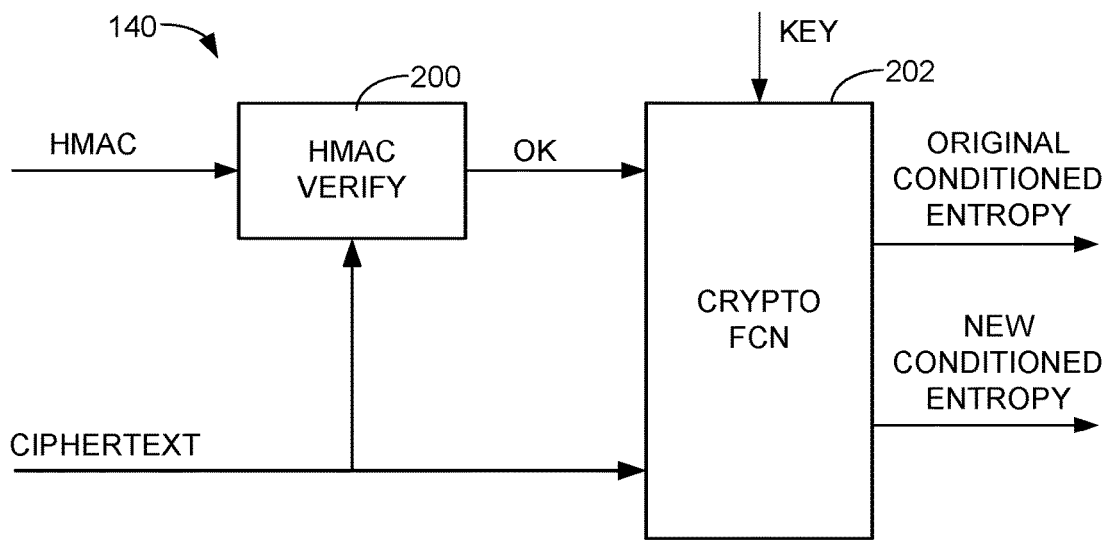
FIG. 8 shows a manner in which the entropy manager circuit subsequently outputs conditioned entropy from the cryptographically secured entropy stored in FIG. 7 in some embodiments.

FIG. 8 shows further aspects of the entropy manager circuit 140 in some embodiments. A cryptographically secured entropy block 194 is retrieved from the memory 196. The HMAC component and the ciphertext component are each supplied to an HMAC verify circuit 200, which recalculates a second HMAC value based on the input ciphertext. The second HMAC value is compared to the first HMAC value retrieved from the memory to detect tampering. If no tampering is detected ("OK"), a cryptographic function circuit 202 similar to those discussed above applies a second level cryptographic function to the input ciphertext.

In some embodiments, the circuit 202 is identical to (or comprises) the encryption engine circuit 190 in FIG. 7, so that the circuit 202 performs a decryption operation to return the original conditioned entropy. In this case, the encryption algorithm is symmetric and the same encryption key (and as necessary, other auxiliary data values) are applied.

In other embodiments, the circuit 202 applies a different cryptographic function such as a second, different encryption algorithm/type or the same encryption but using a different encryption key, etc. In this case, the circuit 202 outputs new conditioned entropy that is different from the originally presented input conditioned entropy. Generally, such processing will operate such that the new conditioned entropy has at least the same amount of entropy (and trust) as the original conditioned entropy.

The output entropy from circuit 202 is thereafter used as discussed above in the various cryptographic functions of the device 104, such as shown in FIGS. 3 and 5.

It will now be appreciated that the various embodiments presented herein provide a number of benefits. Conditioned entropy meeting the needs of a processing device can be cryptographically secured and stored for future use without making the stored entropy subject to discovery, tampering and/or attack. All of the entropy used by a given device can be cryptographically secured in this manner, or only that amount of entropy that is required for a standby supply. The entropy can be used for any suitable purpose including the generation of encryption keys, nonce values, seed values, hash inputs, etc.

While the various embodiments presented above have been directed to the environment of a data storage device, such is merely exemplary and is not limiting. Substantially any processing environment that utilizes entropy can benefit from the implementation of the various principles disclosed herein.

It is to be understood that even though numerous characteristics and advantages of various embodiments of the present disclosure have been set forth in the foregoing description, this description is illustrative only, and changes may be made in detail, especially in matters of structure and arrangements of parts within the principles of the present disclosure to the full extent indicated by the broad general meaning of the terms wherein the appended claims are expressed.

What is claimed is:

1. A computer implemented method comprising:
using at least one entropy source to generate entropy at a selected rate for use by a processor;
concurrently generating additional entropy from the at least one entropy source to form a first block of conditioned entropy for future use by the processor after a power cycling event;
subjecting the first block of conditioned entropy to a first cryptographic process to generate cryptographically secured entropy;
generating a first keyed digest value using the cryptographically secured entropy;
storing the cryptographically secured entropy and the first keyed digest value in a memory;
sensing the power cycling event so that electrical power is removed and subsequently applied to the at least one entropy source and the processor;
subsequently retrieving the cryptographically secured entropy and the first keyed digest value from the memory after the power cycling event;
generating a second keyed digest value using the cryptographically secured entropy retrieved from the memory;
comparing the first and second keyed digest values to determine no tampering has taken place by an attacker with the cryptographically secured entropy retrieved from the memory;
applying a second cryptographic process to the retrieved cryptographically secured entropy to generate a second block of conditioned entropy; and
using the second block of conditioned entropy in a third cryptographic process by the processor, the first block of conditioned entropy sized to supply the processor until such time that the at least one entropy source can begin producing additional entropy for the processor at the selected rate.

2. The method of claim 1, wherein the first block of conditioned entropy is identical to the second block of conditioned entropy.

3. The method of claim 1, wherein the first block of conditioned entropy has a selected entropy level, and the second block of conditioned entropy is different from the first block of conditioned entropy and has the same selected entropy level as the first block of conditioned entropy.

4. The method of claim 1, wherein the first block of conditioned entropy is generated using an entropy manager circuit comprising an extractor circuit that extracts entropy from an input entropy value from the at least one entropy source, and an entropy qualification circuit that provides the first block of conditioned entropy with at least a predetermined threshold level of entropy.

5. The method of claim 4, wherein the subsequently retrieving, applying and using steps are carried out responsive to the entropy manager circuit being in a non-operational state during the power cycling event to generate additional blocks of conditioned entropy.

6. The method of claim 4, wherein the generating, subjecting and storing steps are carried out during a first powered session of a processing device, wherein the method further comprises applying a power cycle operation to the processing device to conclude the first powered session and initiate a subsequent, second powered session, and the subsequently retrieving, applying and using steps are carried out during the second powered session prior to operation of the entropy manager circuit to generate a block of conditioned entropy during the second powered session.

7. The method of claim 1, wherein the first and second keyed digest values are each an HMAC value generated using a hash function.

8. The method of claim 7, wherein the applying and using steps are carried out responsive to the first keyed digest value matching the second keyed digest value.

9. The method of claim 1, wherein circuitry associated with controlling the memory is powered down and powered back up between the storing and subsequently retrieving steps, wherein the at least one source of entropy is configured to continuously provide entropy for use by the circuitry at a selected rate and has a characteristic delay interval after the circuitry is powered up before reestablishing the selected rate, and wherein the first block of conditioned entropy has a size sufficient to supply all entropy required by the circuitry during the delay interval.

10. The method of claim 1, wherein the first cryptographic process comprises an encryption operation upon the first block of conditioned entropy using a selected encryption key to generate ciphertext, and the second cryptographic process comprises a decryption operation upon the ciphertext using the selected encryption key to return the first block of conditioned entropy.

11. The method of claim 1, wherein the at least one entropy source comprises a random number generator.

12. The method of claim 1, wherein the at least one entropy source provides entropy values having a low entropy component, and the generating step comprises using an extractor circuit to provide entropy values having a high entropy component.

13. An apparatus comprising:
   an entropy source configured to generate a sequence of entropy values at a selected rate;
   a processor which uses a first portion of the sequence of entropy values;
   an entropy manager circuit configured to generate a first block of conditioned entropy from a second portion of the sequence of entropy values, apply a first cryptographic process to the first block of conditioned entropy to generate cryptographically secured entropy, generate a first HMAC value using the first block of conditioned entropy, and direct the storage of the cryptographically secured entropy and the first HMAC value in a non-volatile memory; and
   a control circuit configured to, responsive to a power cycle operation in which the entropy manager circuit, the processor and the entropy source were transitioned between an operational state and a deactivated state and then from the deactivated state to the operational state, retrieve the cryptographically secured entropy and the first HMAC value from the non-volatile memory, generate a second HMAC value using the retrieved cryptograhically secured entropy, compare the first and second HMAC values, apply a second cryptographic process to the retrieved cryptographically secured entropy to generate a second block of conditioned entropy responsive to the first HMAC value matching the second HMAC value, and use the second block of conditioned entropy in a third cryptographic process, the size of the first block of conditioned entropy selected to supply the processor until such time that the at least one entropy source can begin producing additional entropy for the processor at the selected rate.

14. The apparatus of claim 13, further comprising a main memory, wherein the third cryptographic process applies an encryption or decryption operation upon user data transferred between the main memory and a host device.

15. The apparatus of claim 13, wherein entropy manager circuit comprises an encryption engine circuit that applies the first cryptographic process to encrypt the first block of conditioned entropy using an encryption key to form ciphertext, and a keyed digest generator circuit which applies a selected hash function to the ciphertext to generate the first HMAC value.

16. The apparatus of claim 13, wherein the control circuit comprises a keyed digest verification circuit which verifies the first and second HMAC values and a decryption engine circuit that applies the second cryptographic process to decrypt the ciphertext using the encryption key to return the first block of conditioned entropy.

17. The apparatus of claim 15, wherein the control circuit comprises a keyed digest verification circuit which verifies the first and second HMAC values and a second encryption engine circuit that encrypts the ciphertext using a second encryption key to generate the second block of conditioned entropy.

18. The apparatus of claim 15, wherein the entropy source is within a hardware trust boundary of the control circuit.

19. The apparatus of claim 13, wherein the one entropy source provides entropy values having a low entropy component, and the entropy manager circuit comprises an extractor circuit configured to generate the first block of conditioned entropy having a high entropy component from the entropy values from the entropy source.

20. The apparatus of claim 13, wherein the first cryptographic process uses Gallois Counter Mode (GCM) to provide the first block of conditioned entropy.

* * * * *